United States Patent
Osswald et al.

(10) Patent No.: US 10,295,389 B2
(45) Date of Patent: May 21, 2019

(54) FILL LEVEL MEASUREMENT DEVICE

(71) Applicant: Endress+Hauser GmbH+Co. KG, Maulburg (DE)

(72) Inventors: Dirk Osswald, Schopfheim (DE); Ralf Reimelt, Freiburg (DE); Herbert Schroth, Schopfheim (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 42 days.

(21) Appl. No.: 15/527,477

(22) PCT Filed: Sep. 17, 2015

(86) PCT No.: PCT/EP2015/071296
§ 371 (c)(1),
(2) Date: May 17, 2017

(87) PCT Pub. No.: WO2016/078796
PCT Pub. Date: May 26, 2016

(65) Prior Publication Data
US 2017/0336238 A1 Nov. 23, 2017

(30) Foreign Application Priority Data
Nov. 17, 2014 (DE) .................. 10 2014 116 763

(51) Int. Cl.
*G01F 23/00* (2006.01)
*G01F 25/00* (2006.01)
(Continued)

(52) U.S. Cl.
CPC ...... *G01F 23/0023* (2013.01); *G01F 23/0084* (2013.01); *G01F 23/268* (2013.01); *G01F 23/284* (2013.01); *G01F 25/0061* (2013.01)

(58) Field of Classification Search
None
See application file for complete search history.

(56) References Cited

U.S. PATENT DOCUMENTS 5,042,299 A * 8/1991 Wells .................. G01F 23/266
　　　　　　　　　　　　　　　　　　　324/663
5,225,777 A * 7/1993 Bross ................. G01R 1/07342
　　　　　　　　　　　　　　　　　　　324/756.03
(Continued)

FOREIGN PATENT DOCUMENTS

CN　　　2277065 Y　　3/1998
CN　　　1407350 A　　4/2003
(Continued)

OTHER PUBLICATIONS

Search Report for German Patent Application No. 10 2014 116 763.5, German Patent Office, dated Jul. 20, 2015, 6 pp.
(Continued)

*Primary Examiner* — Andre J Allen
(74) *Attorney, Agent, or Firm* — Kelly J. Smith; PatServe

(57) ABSTRACT

The present disclosure relates to a fill level measuring device for measuring a fill level of a liquid material in a container, including at least two flexible wire probes that extend into the container, a signal generator, and an end weight for each flexible wire probe. The end-weights are joined together such that they can rotate with respect to each other and/or can move in an axial direction with respect to each other.

13 Claims, 2 Drawing Sheets

(51) Int. Cl.
      *G01F 23/284*     (2006.01)
      *G01F 23/26*      (2006.01)

(56) References Cited

U.S. PATENT DOCUMENTS

| | | |
|---|---|---|
| 7,827,862 B2 | 11/2010 | Fauveau |
| 9,068,875 B1 * | 6/2015 | Wirthlin .............. G01F 23/0061 |
| 2002/0124658 A1 | 9/2002 | Schmidt |
| 2006/0006353 A1 * | 1/2006 | Wirthlin ................ G01F 23/292 |
| | | 250/573 |
| 2011/0088465 A1 * | 4/2011 | Niedzballa .............. G01F 23/22 |
| | | 73/295 |
| 2014/0224010 A1 | 8/2014 | Prilstil |

FOREIGN PATENT DOCUMENTS

| | | |
|---|---|---|
| CN | 103069257 A | 4/2013 |
| CN | 203758577 U | 8/2014 |
| DE | 3427964 A1 | 1/1986 |
| DE | 10009067 A1 | 8/2001 |
| JP | S61-10613 A | 4/1994 |

OTHER PUBLICATIONS

International Search Report for Patent Application No. PCT/EP2015/071296, WIPO, dated Jan. 19, 2016, 11 pp.

* cited by examiner

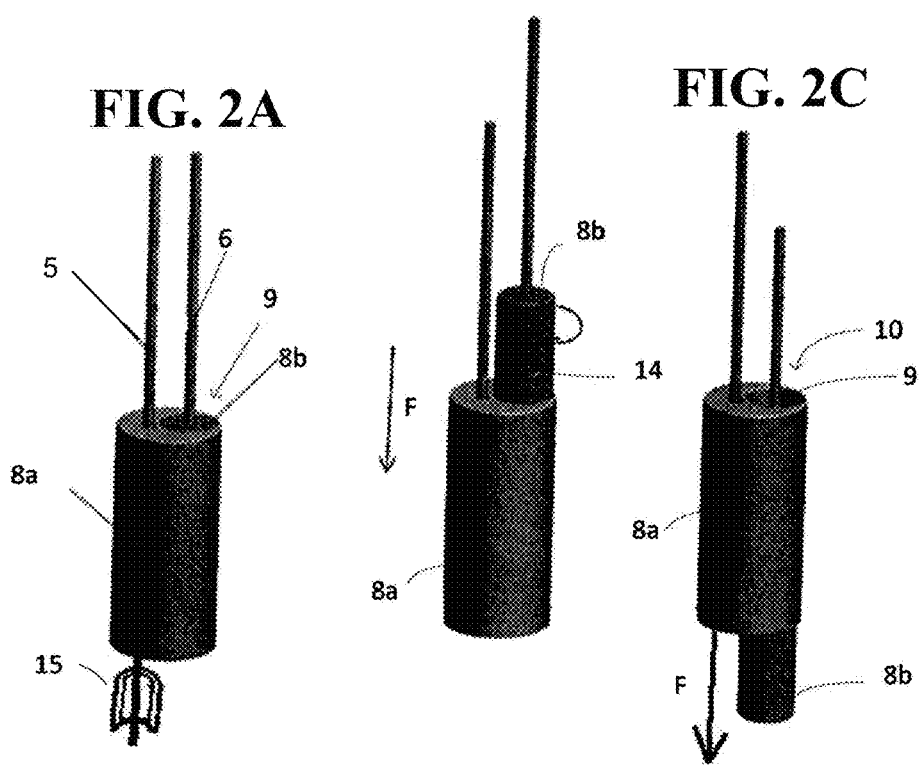
FIG. 2A  FIG. 2B  FIG. 2C
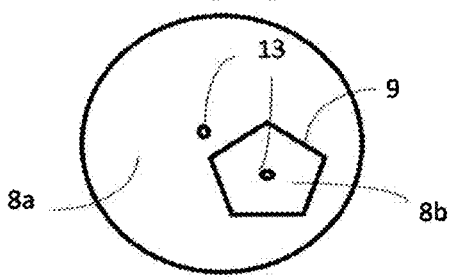
FIG. 3A
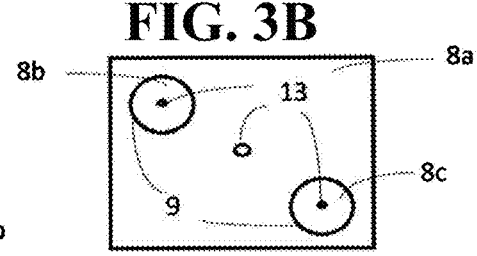
FIG. 3B
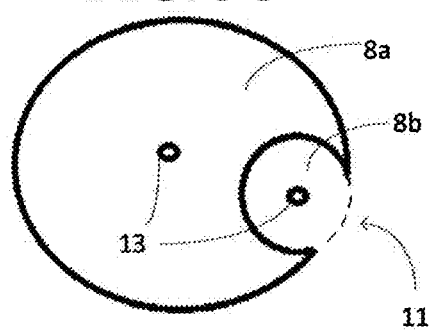
FIG. 3C
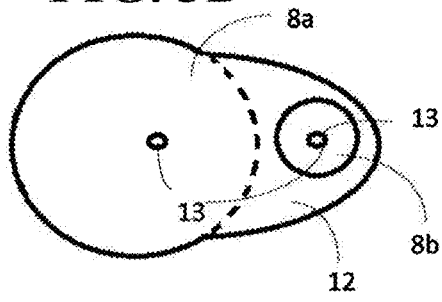
FIG. 3D

FILL LEVEL MEASUREMENT DEVICE

CROSS-REFERENCE TO RELATED APPLICATIONS

The present application is related to and claims the priority benefit of German Patent Application No. 10 2014 116 763.5, filed on Nov. 17, 2014 and International Patent Application No. PCT/EP2015/071296, filed on Sep. 17, 2015 the entire contents of which are incorporated herein by reference.

TECHNICAL FIELD

The present disclosure relates to a fill level measuring device for measuring a fill level of a liquid material in a container, including at least two flexible wire probes that extend into the container and serve to guide an electromagnetic measurement signal generated by a signal generator of the fill level measuring device, further including an end-weight, said end-weight being connected to said at least two flexible wire probes and embodied such that it serves to apply an axial tensile force to at least a portion of the length of each of the at least two flexible wire probes to and from a material interface, whose distance is to be determined.

BACKGROUND

A measurement device in the sense of the present disclosure is not to be understood as being restricted to a unitary collection of hardware components but can also be a system of spatially separated units. A measurement device can be viewed as including a transducer and a transmitter, wherein the transducer serves to convert a process variable, such as the fill level of a material in a tank, into an electrical signal, and wherein the transmitter serves to sample and process this electrical signal to produce a value for the process variable that corresponds to a physical situation that is to be measured. The transmitter, as the case may be, can further transmit and/or record the determined process value for further use. The transducer generally includes a microprocessor and/or microcontroller and various other electrical and electronic circuits. The transducer and the transmitter can be concentrated in a single unitary device, or they can be spatially separated. When they are spatially separated, some sort of communication pathway for the transmission of data and/or energy between the transducer and transmitter is provided, such as a cable or a wireless communications link, for example. The distinction between transmitter and transducer cannot always be strictly applied, as the transducer in some cases serves to preprocess a measurement signal and sometimes even comprises a microprocessor.

Fill level measurement devices with flexible wire probes are used to measure the fill level liquid materials in containers in applications where it is advantageous to concentrate the transmitted microwave energy so that signal losses can be avoided, and an improved sensitivity to the fill level can be attained. It is also possible to use flexible wire probes for capacitive fill level measurements.

Generally, fill level measurement devices that include a flexible wire probe will include also an end-weight for the flexible wire probe that positions the wire probe in a container. The probe is thereby put under a predetermined amount of tension and is oriented vertically. The tension applied to the flexible wire probe essentially eliminates any undesired bends or curves in the wire probe.

When a fill level measuring device includes more than one flexible wire probe, the probes are conventionally attached to a single end-weight to establish a defined end of the measuring range covered by the flexible wire probe.

However, to ensure each of the probes is subjected to a predetermined axial tensile force by the end-weight, the probes must be manufactured so that the lengths of the probes are essentially equal. This requires a high degree of manufacturing precision.

It would be possible to shorten one of the probes after installation as is disclosed for example in the German patent publication DE 000010009067 A1, wherein a measurement device having a cable probe is specified, and a method is given by which the cable probe can be shortened in a simple manner by an end user, wherein the adjustment is made on site and without the use of any special tools or other manufacturer-specific tools.

A further problem that can arise when two or more flexible wire probes are connected to the same end-weight is that flexible wire probes can be twisted such that when they are connected to the end-weight, they have an undesired rotational tension. This twisting can in some cases affect the length of the wire probe. When more than one flexible wire probe is attached to a single end-weight, there is no way for this rotational tension to be released, and in some cases this can inhibit the effectiveness of the end-weight in positioning the flexible wire probes in the container.

SUMMARY

The object of the present disclosure is to provide an arrangement for weighting flexible wire probes in a fill level measuring device, wherein the flexible wire probes are positioned in a predetermined orientation.

The object of the present disclosure is achieved with a fill level measuring device for measuring a fill level of a liquid material in a container, including at least two flexible wire probes that extend into the container and guide, and/or are provided with, an electromagnetic measurement signal generated by a signal generator of the fill level measuring device, wherein each of the at least two flexible wire probes is connected to a corresponding end-weight that applies an axial tensile force to at least a portion of the length of the corresponding flexible wire probe, wherein the corresponding end-weights are joined together (i.e., fit together) such that they can rotate with respect to each other and/or can move in an axial direction with respect to each other, said axial direction being essentially parallel and/or antiparallel to a direction defined by the axial tensile force on the corresponding flexible wire probe.

The flexible wire probes can hereby be positioned by the application of a predetermined axial tensile force irrespective of the relative lengths of the flexible wire probes and/or any internal rotational tensions of the flexible wire probes. Such an end-weight arrangement permits the flexible wire probes to align themselves so that any differences in lengths and/or rotational tensions of the flexible wire probes due to manufacturing tolerances, for example, are automatically self-corrected. Fill level measuring devices having flexible wire probes of this sort can operate on the basis of capacitive measuring principles, wherein the flexible wire probes are provided with an electromagnetic signal, and/or as guided radar time of flight based measuring devices. The flexible wire probes are conventionally composed of metal, and in particular, are generally woven or braided from metal strands in accordance with industrial standards. The flexible wire probe could for example be wire rope including groups of strands wrapped in a uniform helix around a core. The constructions for wire ropes are numerous, but the most common are 6×19 and 6×37 class wire ropes, having 6 groups of 19 strands or 6 groups of 37 strands, respectively. The flexible wire probes could however just as well be composed of an electrically conducting synthetic material. The term flexible in connection with the present disclosure indicates that the wire can be bent into at least one loop without damaging the structure of the wire.

In an embodiment of the present disclosure the end-weights include an electrically conducting material, and the end-weights are joined together such that they are electrically connected to each other. In particular, the end-weights are joined together such that the flexible wire probes are in electrical contact with each other. This has the benefit that the flexible wire probes are in a defined electrically connected condition at the end-weights so that when a transmitted electromagnetic signal being guided by the flexible wire probes encounters the change of impedance caused by the end-weights, a positively polarized reflection signal occurs. The electronics and/or search algorithms of the fill level measurement device can then be set up to recognize this reflected signal, and corresponding information about the location of the end-weights can be extracted.

In an alternative embodiment of the present disclosure, the end-weights are joined together such that they are electrically isolated from each other. By electrically isolating the end-weights, the flexible wire probes are likewise isolated from each other. The probes are therefore in a defined condition, namely that of not being electrically connected. An electromagnetic signal reflected by the end-weights when the end-weights are electrically isolated from each other has a negative polarity. The electronics and/or search algorithms for searching for reflected electromagnetic signals of the fill level measurement device can be adjusted to account for this.

In a further development of the present disclosure, at least one of the end-weights is composed of a non-conductive material. With the use of a non-conductive material, the electrical isolation of the flexible wire probes is assured. In this way, manufacturing cost can also be reduced.

In another embodiment of the present disclosure, a first corresponding end-weight of the at least two end-weights includes a hole for receiving a second corresponding end-weight of the at least two end-weights, said hole opening on a side of the end-weight facing the flexible wire probes, said hole extending from the opening into the end-weight in a direction essentially parallel to the axial tensile force applied by the end-weights. By arranging the end-weights in this way, the end-weights can slide past each other in at least one direction. When one of the flexible wire probes is shorter than the other(s), then the shortest of the flexible wire probes can be connected to the second corresponding end-weight.

In a further development of this embodiment, said hole has an inner geometrical form that corresponds to an outer geometrical form of said second end-weight such that the first and second end-weights can move with respect to each other in an axial direction while remaining electrically connected to each other.

In another embodiment of the present disclosure, said hole is a through hole. When the hole is a through hole as opposed to a blind hole, then there is complete freedom of movement in an axial direction between the two end-weights.

In an embodiment of the present disclosure, the inner geometrical form of said hole is cylindrical, and the outer geometrical form of said second end-weight is cylindrical such that the second end-weight can rotate with respect the first end-weight when inserted into said hole while maintaining an electrical connection to the first end-weight. In this way, the at least two end-weights are free to rotate with respect to each other.

In an embodiment of the present disclosure, the first end-weight includes a recess, said recess is embodied to receive the second end-weight, wherein in the case when the second end-weight is positioned in the recess, said second end-weight is partially exposed in a radial direction. In the case where the second end-weight and the recess itself are formed such that the second end-weight can rotate within the recess, it can be beneficial to expose a portion of the second end-weight to reduce resistive frictional forces between the two end-weights thereby increasing the rotational freedom of movement of the second end-weight.

In another embodiment of the present disclosure, the first end-weight includes an extrusion at least partially enclosing the second end-weight. The extrusion can have a wide variety of forms. The extrusion could, for example, simply include a clipping mechanism and a band, wherein the band at least partially encompasses said second end-weight and is clipped and/or attached to said first end-weight.

In an embodiment of the present disclosure, at least one of the at least two flexible wire probes is positioned in a bore hole provided in one of the corresponding end-weights, and wherein at least one set screw is provided in the corresponding end-weight, said set screw secures the flexible wire probe in this position thereby connecting the end-weight to the flexible wire probe.

In an embodiment of the present disclosure at least one of the at least two flexible wire probes is positioned in a bored through hole provided in one of the corresponding end-weights, said flexible wire probe being prevented from sliding through the end-weight by a crimp sleeve that is crimped onto the flexible wire probe, thereby connecting the end-weight to the flexible wire probe. In this way, the end-weight can rotate with respect to the flexible wire probe. A connection between the end-weight and probe realised in this way provides additional rotational freedom of movement.

In an embodiment of the present disclosure, the bore hole for receiving the flexible wire probe is provided essentially parallel to, and in the immediate vicinity of, an axis defining a center of mass of the end-weight, such that a portion of the flexible wire probe that is positioned within the end-weight is oriented in said axial direction. In other words, the end-weight does not hang with a tilt.

BRIEF DESCRIPTION OF THE DRAWINGS

The present disclosure will next be more closely described with reference to the following figures.

FIGS. 2A, 2B, and 2C show a perspective of an exemplary end-weight construction for two flexible wire probes.

FIGS. 3A-3D show cross sections of four exemplary end-weight constructions.

DETAILED DESCRIPTION

Figure 1:
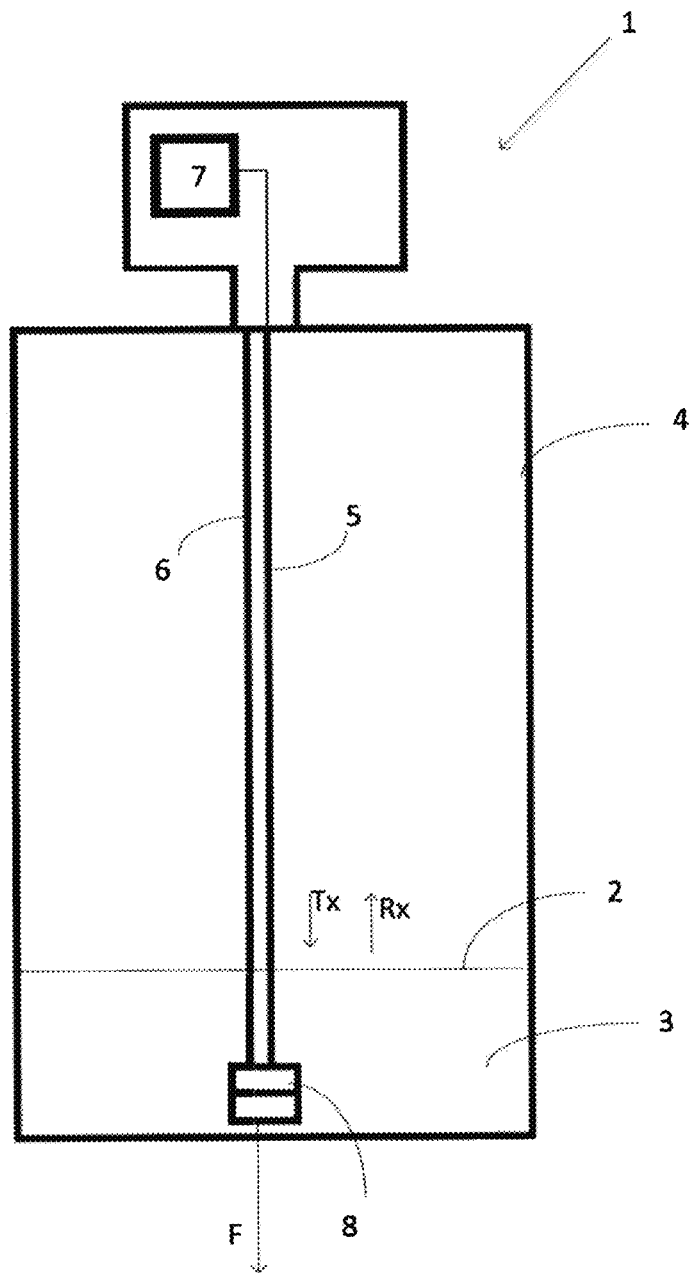
FIG. 1 shows a schematic of a guided wave fill level measurement device according to the prior art.

FIG. 1 shows a schematic of a guided wave fill level measurement device 1 according to the prior art. The fill level measurement device 1 is installed in a container 4 and has two flexible wire probes 5, 6 that are weighted with an end-weight 8. The end-weight 8 here includes two parts that are arranged in a stacked formation, such that both flexible wire probes 5, 6 are connected to the stack of weights 8 as a whole. A construction of this sort is disclosed in the U.S. Pat. No. 7,827,862, for example.

A fill level measurement device 1 having more than one flexible wire probe 5, 6 is typically used to measure the fill level 2 of a liquid material 3 in a container 4. The flexible wire probes 5, 6 serve to guide a measurement signal Tx, Rx, such as a microwave electromagnetic signal, or are provided with an electromagnetic measurement signal for capacitive measurements. When the fill level measurement device operates on the basis of time of flight radar measurement principles, a first probe 5 is referred to as a center conductor 5. The measurement signal Tx is coupled onto this center conductor from an electronics unit such as a signal generator 7 of the fill level measurement device 1 and propagates along the conductor 5. When the measurement signal Tx encounters a change in impedance, at least a portion of the signal Rx is reflected and propagates along the probe 5 in the opposite direction. A change in impedance can be caused by a geometry change in the wire probe 5, for example, or by a change in the dielectric constant of the material 3 surrounding the wire probe 5, such as at the upper surface 2 of a material 3 contained in the container 4. The impedance can also occur at the border between a first and second material contained 3 in the container, if two or more materials 3 are present. For example, when oil and water are both present in a container 4, they will separate, and the oil will form a so-called separating layer above the water.

The end-weight 8 connected to the flexible wire probes embody a change in geometry in the propagation path of the measurement signal Tx. Therefore, a so-called end-of-probe reflection occurs when the measurement signal Tx reaches the end-weight 8. The polarity of the end-of-probe reflection depends on whether the end-weight 8 is electrically grounded or not. The at least one flexible wire probe 6 that is not the center conductor serves as a shield wire(s) 6 for the measurement signal Tx, Rx. The shield wire(s) 6 is typically connected to an electrical ground, for example by being electrically connected to the container 4 if the container 4 is constructed out of a conducting material.

In the case where each of the flexible wire probes 5, 6 is connected to an corresponding end-weight 8a, 8b and if the end-weights 8a, 8b are arranged so that they are in electrical contact, the polarity of the end-of-probe reflection will be positive with respect to a polarity defined by the generated measurement signal Tx, and if the end-weights 8a, 8b are arranged to be electrically isolated from each other, the end-of-probe reflection will have a negative polarity. It is generally advantageous to arrange and/or join the end-weights 8a, 8b so that they are in a defined condition, that is, so that they are either electrically connected to, or electrically isolated from, each other. When the end-weights 8a, 8b are in a defined condition, the reflection caused by the end-weights 8a, 8b can be used in signal processing methods that are applied to the reflected measurement signal Rx.

The shield wire(s) 6 influences the waveform of the propagating measurement signal Tx, Rx, to reduce losses in the signal Tx, Rx. Generally speaking, the waveform of the measurement signal Tx, Rx that propagates along the flexible wire probes 5, 6 is concentrated in an area bordered by the shield wire(s) 6. When the shield wire 6 is embodied as a coaxially formed tube, for example, the entire measurement signal Tx, Rx is contained within the tube. When a shield wire 6 is embodied as a single flexible wire probe 6, the strength of the measurement signal Tx, Rx is greatest in the space between the centre conductor 5 and the shield wire 6.

FIGS. 2A-2C show a perspective of an exemplary end-weight construction for two flexible wire probes 5, 6. In FIG. 2A, a cylindrically shaped end-weight 8a is connected to the center conductor 5. The connection can be effected by means of one or more set screws 14, screwed in from the outside of the end-weight 8a so as to fix the wire probe 5 in a bored blind hole 13, in which the flexible wire probe 5 is positioned. Alternatively, the flexible wire probe 5 can be fed through a bored through hole 13 and a crimp sleeve 15 can be crimped onto the wire probe 5 on the far side of the end-weight 8a such that the wire probe 5 can no longer pass back through the bored through hole 13. In this case, a portion of the bored through hole 13 on the side of end-weight 8a closest to the crimped sleeve 15 can be widened so that the crimp sleeve 15 can be hidden within the end-weight 8a. This can be accomplished, for example, by partially re-boring the bored through hole 13 on the back side, which faces the crimp sleeve 15, providing it with a wider diameter than the bored through hole 13 along a predetermined length, said length being at least as long as the axial length of the crimp sleeve 15. Either of these methods for connecting a flexible wire probe 5, 6 to an end-weight 8a, 8b can be used for any of the connections between the flexible wire probes 5, 6 and end-weights 8a, 8b.

Accordingly, the second end-weight 8b shown in FIG. 2A can be connected to the second flexible wire probe 6, that is the shield wire 6, in accordance with either of the above described connection possibilities. An advantage of using a crimped sleeve 15 for the connecting an end-weight 8a, 8b to a flexible wire probe 5, 6 is that the end weight 8a, 8b maintains rotational freedom of movement with respect to the flexible wire probe 5, 6. The second end-weight 8b is positioned in a through hole 9 provided in the first end-weight 8a. The outer diameter of the cylindrically formed second end-weight 8b corresponds to the inner diameter of the through hole 9 of the first end-weight 8a so that the second end-weight 8b can rotate and slide freely within the first end-weight 8a while remaining in electrical contact with the first end-weight 8a. FIG. 2B shows the first end-weight 8a in a position, wherein the second flexible wire probe 6 is shorter than the first flexible wire probe 5. When the flexible wire probes 5, 6 are freely hanging into the container 4, the first and second end-weights 8a, 8b are therefore displaced with respect to each other, while maintaining electrical contact. If the end-weights 8a, 8b were of the sort known in the prior art, the first flexible wire probe 5 would in this case be relatively slack, as the end-weight 8a would not be able to apply an axial tensile force. FIG. 2C shows the reverse situation, wherein the second flexible wire probe 6 is manufactured so that it is longer than the first flexible wire probe 5.

The end-weight construction shown in FIGS. 2A-2C also permits individual end-weights 8a, 8b to rotate with respect to each other. During the manufacture of a fill level measuring device 1 having flexible wire probes 5, 6, the wire used for the probes is often unrolled from a spool of wire. As the case may be, the flexible wire that is unrolled from such a spool can be twisted when it comes off the spool so that the flexible wire has an internal rotational tension. An end-weight construction such as the one shown here provides a possibility for the flexible wire probes 5, 6 to untwist or unravel in order to release this rotational tension, after being installed.

The individual end-weights 8a, 8b can also be covered with an electrically isolating material, or as the case may be, be completely formed from non-conductive material so that the end-weights 8a, 8b are in the defined condition of be electrically isolated from each other. In this case, the end-of-probe reflection will have a negative polarity.

FIGS. 3A-3D show cross sections of four exemplary end-weight constructions. In FIG. 3A the first end-weight 8a is generally cylindrical in form and comprises a hole 9 having a polygonal inner geometry. In this case the inner geometry is in particular pentagonal. The hole 9 serves to receive the second end-weight 8b, whose outer geometry corresponds to the inner geometry of the hole 9, being namely also pentagonal in form. Both of the end-weights 8a, 8b include bore holes 13 for the insertion of flexible wire probes 5, 6. In FIG. 3B, the first end-weight 8a is a prism having a rectangular cross section. Here, two holes 9 are provided for end-weights 8b, 8c that are connected to two individual shield-wires 6. FIG. 3C shows once again the cross section of a first cylindrical end-weight 8a, which has a generally circular cross section. The first end-weight 8a comprises a recess 11, which serves to receive a second end-weight 8b. In this case, the second end-weight 8b is joined to the first end-weight 8a in such a way that lateral movement is prevented. The second end-weight 8b, when positioned in this recess 11, is exposed to the medium or material 3 in the container 4 in a radial direction, as it is not completely enclosed by the first end-weight 8a. Alternative to the embodied shown in FIG. 3C, in FIG. 3D the cross section of a first end-weight 8a is shown, wherein the first end-weight 8a includes an extrusion 12 which encloses a second end-weight 8b. To fulfill the functional requirements that the end weights 8a, 8b, 8c be joined so as to prevent lateral movement, and so that rotational and/or axial freedom of movement is maintained between the at least two end-weights 8a, 8b, there is no need for the extrusion 12 to extend along the entire height of the first end-weight 8a. Indeed, the extrusion 12 can be a mere band of material that loops out from the cylindrically formed body of the first end-weight 8a.

What is claimed is:

1. A fill level measuring device for measuring a fill level of a liquid material in a container, comprising:
   at least two flexible wire probes that extend into the container;
   a signal generator embodied to generate an electromagnetic measurement signal and to provide the electromagnetic measurement signal to the flexible wire probes, wherein the flexible wire probes are embodied to receive and to guide the electromagnetic measurement signal; and
   an end-weight for each flexible wire probe, each end-weight connected to a corresponding flexible wire probe of the least two flexible probes and embodied to apply an axial tensile force to at least a portion of the length of its corresponding flexible wire probe,
   wherein the end-weights are fit together such that they can rotate with respect to each other and/or can move in an axial direction with respect to each other, said axial direction being parallel and/or antiparallel to a direction defined by the axial tensile force on the corresponding flexible wire probe.

2. The fill level measuring device according to claim 1, wherein the end-weights include an electrically conducting material and the end-weights are electrically connected to each other.

3. The fill level measuring device according to claim 1, wherein the end-weights are electrically isolated from each other.

4. The fill level measuring device according to claim 1, wherein at least one of the end-weights is composed of a non-conductive material.

5. The fill level measuring device according to claim 1, wherein a first end-weight includes a hole for receiving a second end-weight, the hole disposed on a side of the first end-weight facing the flexible wire probes and extending into the first end-weight in a direction parallel to the axial tensile force applied by the first end-weight.

6. The fill level measuring device according to claim 5, wherein the hole has an inner geometrical form that corresponds to an outer geometrical form of the second end-weight such that the first end weight and second end-weight can move with respect to each other in an axial direction while remaining electrically connected to each other.

7. The fill level measuring device according to claim 5, wherein the hole is a through hole.

8. The fill level measuring device according to claim 6, wherein the inner geometrical form of the hole is cylindrical and the outer geometrical form of the second end-weight is cylindrical such that the second end-weight can rotate with respect the first end-weight when inserted into the hole while maintaining an electrical connection to the first end-weight.

9. The fill level measuring device according to claim 1, wherein a first end-weight includes a recess embodied to receive a second end-weight such that when the second end-weight is disposed in the recess, the second end-weight is partially exposed in a radial direction.

10. The fill level measuring device according to claim 1, wherein a first end-weight includes an extrusion embodied to at least partially enclose a second end-weight.

11. The fill level measuring device according to claim 1, wherein at least one of the flexible wire probes is disposed in a bore hole provided in a corresponding end-weight and at least one set screw is provided in the corresponding end-weight to secure the flexible wire probe and thereby connect the flexible wire probe to its corresponding end-weight.

12. The fill level measuring device according to claim 1, wherein at least one of the at least two flexible wire probes is disposed in a bored through hole provided in a corresponding end-weight, the flexible wire probe being prevented from sliding through the corresponding end-weight by a crimp sleeve that is crimped onto the flexible wire probe, thereby connecting the corresponding end-weight to the flexible wire probe.

13. The fill level measuring device according to claim 12, wherein the bored through hole is disposed parallel to, and in the immediate vicinity of, an axis defining a center of mass of the corresponding end-weight, such that a portion of the flexible wire probe that is positioned within the corresponding end-weight is oriented in said axial direction.

* * * * *